US012712240B2

(12) United States Patent
Min

(10) Patent No.: US 12,712,240 B2
(45) Date of Patent: Aug. 18, 2026

(54) SEPARATOR HAVING DIFFERENCE IN POROSITY ALONG THICKNESS DIRECTION AND MANUFACTURING METHOD THEREOF

(71) Applicant: LG ENERGY SOLUTION, LTD., Seoul (KR)

(72) Inventor: Ji Won Min, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 790 days.

(21) Appl. No.: 17/628,128

(22) PCT Filed: Sep. 2, 2020

(86) PCT No.: PCT/KR2020/011798
§ 371 (c)(1),
(2) Date: Jan. 18, 2022

(87) PCT Pub. No.: WO2021/054653
PCT Pub. Date: Mar. 25, 2021

(65) Prior Publication Data

US 2022/0399613 A1 Dec. 15, 2022

(30) Foreign Application Priority Data

Sep. 19, 2019 (KR) ........................ 10-2019-0115296

(51) Int. Cl.

| | |
|---|---|
| ***H01M 50/417*** | (2021.01) |
| ***H01M 50/403*** | (2021.01) |
| ***H01M 50/446*** | (2021.01) |
| ***H01M 50/449*** | (2021.01) |
| ***H01M 50/451*** | (2021.01) |
| ***H01M 50/457*** | (2021.01) |
| ***H01M 50/46*** | (2021.01) |
| ***H01M 50/491*** | (2021.01) |

(52) U.S. Cl.
CPC ....... *H01M 50/417* (2021.01); *H01M 50/403* (2021.01); *H01M 50/446* (2021.01); *H01M 50/449* (2021.01); *H01M 50/451* (2021.01); *H01M 50/457* (2021.01); *H01M 50/46* (2021.01); *H01M 50/491* (2021.01)

(58) Field of Classification Search
None
See application file for complete search history.

(56) References Cited

U.S. PATENT DOCUMENTS

| | | | | |
|---|---|---|---|---|
| 5,830,603 | A | 11/1998 | Oka et al. | |
| 7,709,140 | B2 | 5/2010 | Hennige et al. | |
| 2002/0023874 | A1 | 2/2002 | Penth et al. | |
| 2006/0078791 | A1 | 4/2006 | Hennige et al. | |
| 2009/0269489 | A1 | 10/2009 | Hennige et al. | |
| 2015/0099158 | A1* | 4/2015 | Iwase .................. | H01M 50/457 429/144 |
| 2015/0340679 | A1 | 11/2015 | Shimura et al. | |
| 2018/0183108 | A1 | 6/2018 | Yeo et al. | |
| 2020/0251709 | A1 | 8/2020 | Lee et al. | |
| 2021/0194064 | A1 | 6/2021 | Yeo et al. | |
| 2022/0094019 | A1* | 3/2022 | Jeon .................. | H01M 10/0525 |

FOREIGN PATENT DOCUMENTS

| | | | |
|---|---|---|---|
| CN | 1717820 | A | 1/2006 |
| CN | 104871343 | A | 8/2015 |
| CN | 107611314 | A | 1/2018 |
| CN | 108807822 | A | 11/2018 |
| JP | 7-161343 | A | 6/1995 |
| JP | 2015-88430 | A | 5/2015 |
| KR | 10-2000-0007593 | A | 2/2000 |
| KR | 10-2000-0055678 | A | 9/2000 |
| KR | 10-2010-0051353 | A | 5/2010 |
| KR | 10-1187590 | B1 | 10/2012 |
| KR | 10-2013-0123568 | A | 11/2013 |
| KR | 10-2014-0007752 | A | 1/2014 |
| KR | 10-2016-0097537 | A | 8/2016 |
| KR | 10-2016-0107809 | A | 9/2016 |
| KR | 10-2016-0118586 | A | 10/2016 |
| KR | 10-1703956 | B1 | 2/2017 |
| KR | 10-2018-0075003 | A | 7/2018 |
| WO | WO 2012/120579 | A1 | 9/2012 |
| WO | WO 2017/014147 | A1 | 1/2017 |
| WO | WO 2019/039820 | A2 | 2/2019 |

OTHER PUBLICATIONS

Machine translation of JP 07161343, Jun. 1995.*
International Search Report for PCT/KR2020/011798 (PCT/ISA/210) mailed on Dec. 4, 2020.
Extended European Search Report for European Application No. 20864395.7, dated Sep. 28, 2022.

* cited by examiner

*Primary Examiner* — Jonathan Crepeau
(74) *Attorney, Agent, or Firm* — Birch, Stewart, Kolasch & Birch, LLP

(57) ABSTRACT

A separator for a secondary battery including a polyolefin and a separator body having a porous structure. The separator body has a difference in porosity along a thickness direction. It is possible to improve the problem of imbalance in ionic conductivity caused by differences in thickness and electrical conductivity between a positive electrode and a negative electrode.

13 Claims, No Drawings

SEPARATOR HAVING DIFFERENCE IN POROSITY ALONG THICKNESS DIRECTION AND MANUFACTURING METHOD THEREOF

TECHNICAL FIELD

This application claims the benefit of priority to Korean Patent Application No. 2019-0115296 filed on Sep. 19, 2019, the disclosure of which is hereby incorporated by reference herein its entirety.

The present invention relates to a separator for a secondary battery having a difference in porosity along a thickness direction, and more particularly to a separator body having a different porosity along a thickness direction in order to prevent performance deterioration due to a difference in ionic conductivity between a positive electrode and a negative electrode.

BACKGROUND ART

Among the separators of lithium secondary batteries, a safety reinforced separator (hereinafter referred to as 'SRS separator') with improved safety is widely used. The SRS separator is configured to have a structure in which a coating layer including an inorganic material and a binder is formed on a polyolefin-based substrate, thereby providing high safety against high temperatures.

The coating layer of the SRS separator forms a porous structure by the inorganic material and the binder. A volume in which a liquid electrolyte solution is placed is increased by virtue of the porous structure, thereby improving lithium ionic conductivity and an electrolyte impregnation rate of the SRS separator. As such, the SRS separator can improve both the performance and stability of a lithium secondary battery.

A positive electrode and a negative electrode constituting a lithium secondary battery have different ionic conductivity of lithium ions depending on the type of active material, thickness of an electrode, and electrical conductivity. If the ionic conductivities of the positive electrode and the negative electrode disposed with a separator therebetween are different, the battery performance may deteriorate.

In order to make the overall mass transfer rate of the positive electrode and the negative electrode having different ionic conductivities the same, the areas of the electrodes may be set differently or the thicknesses of the electrodes may be designed differently.

Korean Patent Application Publication No. 2013-0123568 (2013 Nov. 13) (hereinafter referred to as 'Patent Document 1') discloses a separator having a structure in which the sizes of an inorganic material coated on a first surface of a separator body and an inorganic material coated on a second surface of the separator body are different from each other, in order to improve the impregnation amount of an electrolyte and the lithium ionic conductivity by increasing the porosity of the separator. The separator of Patent Document 1 has only the effect of increasing the porosity of a coating layer.

Korean Patent Application Publication No. 2016-0118586 (2016 Oct. 12) (hereinafter referred to as 'Patent Document 2') discloses a multilayer electrode, characterized in that in an electrode including three or more layers of electrode mixture layers, the porosity of the electrode mixture layer located near a current collector is relatively smaller than the porosity of the electrode mixture layer located far from the current collector.

Patent Document 2 is a technology for improving adhesion by forming an electrode mixture layer structure having a difference in porosity, and preventing the electrode from being deintercalated even when volume expansion and contraction occur due to charging and discharging.

Korean Patent Application Publication No. 2016-0097537 (2016 Aug. 18) (hereinafter referred to as 'Patent Document 3') discloses a separator configured to improve adhesion between the separator and a positive electrode or between the separator and a negative electrode by forming a coating layer including a binder having an affinity with a positive binder on a surface in contact with the positive electrode and a coating layer including a binder having an affinity with a negative binder on a surface in contact with the negative electrode.

Patent Document 3 discloses a configuration for improving the adhesion between the separator and the electrode, but does not solve the difference in ionic conductivity between the positive electrode and the negative electrode.

As described above, various methods have been proposed to solve the problem of deteriorating battery performance due to the occurrence of a difference in ionic conductivity between the positive electrode and the negative electrode. However, none of them is a clear solution.

PRIOR ART DOCUMENTS (Patent Document 1) Korean Patent Application Publication No. 2013-0123568 (2013 Nov. 13)

(Patent Document 2) Korean Patent Application Publication No. 2016-0118586 (2016 Oct. 12)

(Patent Document 3) Korean Patent Application Publication No. 2016-0097537 (2016 Aug. 18)

DISCLOSURE

Technical Problem

The present invention has been made in view of the above problems, and it is an object of the present invention to provide a separator for a secondary battery capable of preventing the lifespan and capacity of a battery from deteriorating due to a difference in ionic conductivity between a positive electrode and a negative electrode, and a method of manufacturing the same.

Technical Solution

In accordance with the present invention, the above and other objects can be accomplished by the provision of a separator for a secondary battery, wherein the separator may include a separator body having a porous structure, wherein the separator body includes a polyolefin, and the separator body may have a structure having a difference in porosity along a thickness direction.

The separator body may not have an interface in which a difference in porosity occurs, and wherein a porosity continuously changes.

The separator body may include at least one of a portion in which a porosity increases along the thickness direction and a portion in which a porosity decreases along the thickness direction.

The separator body may have a maximum porosity at a center of the thickness direction of the separator body.

The separator may further comprise a first coating layer on a first surface of the separator body and a second coating layer on a second surface of the separator body.

In addition, a hardness of the first coating layer and a hardness of the second coating layer may be different from each other.

The first coating layer may comprise a first inorganic material having a first hardness and a first binder, and the second coating layer may comprise a second inorganic material having a second hardness and a second binder, wherein the first inorganic material and the second inorganic material may have the same hardness and are present in different amount ratios, or may have different hardnesses regardless of a amount ratio.

In addition, the present invention may be combined selectively in combination of any one or more of the above constructions, and it is obvious to a person skilled in the art that physically impossible or inappropriate cases are excluded.

The present invention also provides a method of manufacturing the separator, the method comprising the following steps:

1) preparing a separator body having a porous structure comprising a polyolefin;
2) forming a first coating layer on a first surface of the separator body of step 1) and forming a second coating layer on a second surface of the separator body of step 1); and
3) pressing the separator of step 2).

Meanwhile, the method may further comprise a step of removing the first coating layer and the second coating layer after step 3).

A hardness of the first coating layer and a hardness of the second coating layer may be different from each other.

In addition, a compression ratio of a first surface side of the separator body and a compression ratio of a second surface side of the separator body may be different.

The first coating layer may comprise a first inorganic material and a first binder, and the second coating layer may comprise a second inorganic material and a second binder, wherein a rolling strength of the first coating layer and the second coating layer may be dependent on a type and amounts of the first inorganic material, the second inorganic material, the first binder, and the second binder.

In step 3), the same pressure is applied from an outside of the first coating layer and the second coating layer toward the separator body.

In addition, the present invention provides an electrode assembly having a stacked structure in which a separator manufactured by the above method is interposed between a positive electrode and a negative electrode.

Between the positive electrode and the negative electrode, an electrode having high ionic conductivity may be disposed in a direction having low porosity in the separator, and an electrode having low ionic conductivity may be disposed in a direction having high porosity in the separator.

In addition, any one or more of the constructions of the manufacturing method may be combined selectively, and it is obvious to a person skilled in the art that physically impossible or inappropriate cases are excluded.

BEST MODE

Hereinafter, preferred embodiments of the present invention will be described in detail such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

The inclusion of a certain element does not mean that other elements are excluded, but means that such elements may be further included unless mentioned otherwise.

The detailed description by limiting or adding elements may be applied to all inventions unless there is a specific limitation, and is not limited to a specific invention.

The present invention relates to a separator for a secondary battery, wherein the separator may include a separator body having a porous structure including a polyolefin, and the separator body may be configured to have a structure having a difference in porosity along a thickness direction.

In a lithium secondary battery, charging and discharging are performed as lithium ions move through a separator disposed between a positive electrode and a negative electrode. The positive electrode and the negative electrode have a difference in ionic conductivity of lithium ions depending on the type of active material, thickness of an electrode, and electrical conductivity.

When the difference in ionic conductivity between the positive electrode and the negative electrode is large, the capacity and lifespan of the battery may deteriorate as the irreversibility of lithium ions increases.

As the present invention provides a separator for a secondary battery having a difference in porosity along a thickness direction, the present invention may alleviate a problem of imbalance in ionic conductivity between a positive electrode and a negative electrode by disposing an electrode having high ionic conductivity on a side with a low porosity of the separator and disposing an electrode having low ionic conductivity on a side with a high porosity of the separator.

In order to manufacture a separator having a difference in porosity along a thickness direction as described above, a process including preparing a separator body having a porous structure comprising a polyolefin; forming a first coating layer on a first surface of the separator body and forming a second coating layer on a second surface of the separator body; and pressing the separator having the first coating layer and the second coating layer formed thereon may be performed.

In particular, when the separator body comprises the first surface and the second surface and the same pressure is applied from an outside of the first coating layer and the second coating layer toward the separator body, the coating layer having high hardness has a relatively low porosity due to a large decrease in the porosity of the separator body since the coating layer having high hardness has a high rolling strength with respect to the separator body, and the coating layer having low hardness has a relatively high porosity due to a small decrease in the porosity of the separator body since the coating layer having low hardness has a low rolling strength with respect to the separator body.

In particular, assuming that the first coating layer and the second coating layer themselves are hardly compressed, and that the pressure applied to the first coating layer and the second coating layer is directly applied to the separator body, the compression ratio of a first surface side of the separator body and the compression ratio of a second surface side of the separator body are different as a difference in rolling strength occurs depending on a difference in hardness between the first coating layer and the second coating layer.

Therefore, it is possible to manufacture a separator in which a difference in porosity occurs between the first surface side and the second surface side of the separator body.

Since the difference in porosity of the separator is formed through a rolling process, the difference in porosity does not occur based on a specific interface, and the separator may be configured in a form in which the porosity continuously changes along the thickness direction of the separator.

For example, since the pressure applied to an outer side of the separator body is greater than the pressure applied to the center of the separator body in the thickness direction, the first surface and the second surface subjected to the greatest pressure may show the greatest change in porosity and the porosity at the center may be the greatest.

Therefore, the porosity may increase from the first surface of the separator body toward the center of the separator body, and from the second surface of the separator body toward the center of the separator body.

The first coating layer may comprise a first inorganic material and a first binder, and the second coating layer may comprise a second inorganic material and a second binder, wherein the first inorganic material and the second inorganic material may have the same hardness and different content ratios.

For example, when the same material is used as the first inorganic material and the second inorganic material, in order to configure the first coating layer and the second coating layer to have a difference in hardness, the content ratio of the first inorganic material and the second inorganic material used in each of the coating layers may be different.

In addition, the first inorganic material and the second inorganic material may have different hardnesses of the first coating layer and the second coating layer by using materials having different hardness regardless of the content ratio.

The first inorganic material and the second inorganic material are not particularly limited as long as they are generally used in the manufacturing of a separator coating layer for a secondary battery. The first inorganic material and the second inorganic material may be at least one selected from the group consisting of (a) an inorganic material having piezoelectricity, and (b) an inorganic material having lithium ion transfer ability.

The inorganic material having piezoelectricity means a material which is a nonconductor at normal pressure but, when a certain pressure is applied thereto, an internal structure is changed and thereby has conductivity. In particular, the inorganic material having piezoelectricity exhibits high dielectric constant characteristics having a dielectric constant of 100 or more and has a potential difference between both faces in which one face is charged by a positive electrode and the other face is charged by a negative electrode by electric charge generated when particles are tensioned or compressed by a certain pressure.

In a case in which the inorganic material having the above-mentioned characteristics is used as a porous active layer ingredient, a short-circuit may occur in the positive electrode and the negative electrode due to external impact, such as a needle-shaped conductor, whereby the positive electrode and the negative electrode may not directly contact each other due to inorganic material coated on a separator, and potential differences in particles may occur due to piezoelectricity of the inorganic material. Accordingly, electron migration, namely, fine current flow, is achieved between the positive electrode and the negative electrode, whereby voltage of the battery is gradually reduced, and therefore stability may be improved.

Examples of the inorganic material having piezoelectricity may be at least one selected from the group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3—PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC and a combination thereof, but the present invention is not limited thereto.

The inorganic material having lithium ion transfer ability indicates an inorganic material which contains lithium elements, does not save lithium, and transports lithium ions. The inorganic material having lithium ion transfer ability may transfer and transport lithium ions by a defect present in a particle structure. Consequently, lithium ionic conductivity in a battery is improved, and therefore battery performance can be improved.

Examples of the inorganic material having lithium ion transfer ability may be at least one selected from the group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glasses (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$) such as $Li_{3.25}Ge_{0.25}P_{0.75}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4—Li_2S—SiS_2$, $P_2S_5$-based glass ($Li_xP_yS_z$, where $0<x<3$, $0<y<3$, and $0<z<7$) such as $LiI—Li_2S—P_2S_5$, and a combination thereof, but the present invention is not limited thereto.

In addition, the first inorganic material and the second inorganic material may be a metal hydroxide or a hydroxide of a metal oxide represented by the following formula.

$M(OH)_x$ (wherein in the formula, M is B, Al, Mg, Co, Cu, Fe, Ni, Ti, Au, Hg, Zn, Sn, Zr, or oxides thereof, and x is an integer of 1 to 4.)

A composition ratio of a binder polymer to the first inorganic material and the second inorganic material is not greatly limited and the first inorganic material and the second inorganic material to the binder may be controlled in a range of 10:90 to 99:1 based on the weight ratio, preferably in a range of 80:20 to 99:1.

When the binder polymer is greater than 90 wt % based on the total weight of the first and second inorganic materials and the binder polymer, the amount of binder polymer is excessively increased and thereby pore sizes and porosity are reduced due to reduction of interstitial volume formed among inorganic materials, and, accordingly, final battery performance is deteriorated. On the contrary, when the binder polymer is less than 1 wt % based on the total weight of the first and second inorganic materials and the binder polymer, the amount of binder polymer is too low and thereby adhesive strength among inorganic materials is weakened, and accordingly, the mechanical properties of a final organic/inorganic composite porous separator may be deteriorated.

The first binder and the second binder are not particularly limited as long as they are generally used in the manufacturing of a separator coating layer for a secondary battery. For example, the first binder and the second binder may use any one binder polymer selected from the group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxylmethyl cellulose, or a mixture of two or more thereof.

In the separator according to the present invention, the rolling strength of the first coating layer and the second coating layer is a value dependent on the type and content ratio of the first inorganic material, the second inorganic material, the first binder, and the second binder, and thus, a separator body having an appropriate porosity may be manufactured by controlling the rolling strength depending on the type and content ratio of the first inorganic material, the second inorganic material, the first binder, and the second binder.

In a concrete example, after the step of rolling in the method of manufacturing a separator, a step of removing the first coating layer and the second coating layer may be further included.

The separator body is in a state in which a structure having a difference in porosity is formed through the rolling step, and thus, even if the first coating layer and the second coating layer are removed, the minimum object for reducing an efficiency decrease due to an electrode having a difference in ionic conductivity can be achieved.

In addition, when the first coating layer and the second coating layer are removed, the initial resistance may be low and the capacity retention may be high as compared to before removal.

A coating layer including an inorganic material may be added again as needed on both surfaces of the separator body from which the first coating layer and the second coating layer have been removed.

The present invention provides an electrode assembly having a stacked structure in which a separator manufactured by the method of manufacturing a separator as described above is interposed between a positive electrode and a negative electrode, and a lithium secondary battery having a structure in which the electrode assembly is impregnated with a lithium salt-containing non-aqueous electrolyte.

The positive electrode may be manufactured by, for example, applying a positive electrode mixture including a positive electrode active material on a positive electrode current collector and drying the positive electrode mixture. The positive electrode mixture may optionally further comprise a binder, a conductive agent, a filler and the like, as needed.

In general, the positive electrode current collector is manufactured so as to have a thickness of 3 μm to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the adhesion force of the positive electrode active material. The current collector may be configured in various forms, such as those of a film, a sheet, a foil, a net, a porous body, a foam body, and a non-woven fabric body.

The positive electrode active material may be a material capable of undergoing electrochemical reaction, and comprise a lithium transition metal oxide, which contains two or more transition metals, for example, a layered compound such as lithium cobalt oxide ($LiCoO_2$) and lithium nickel oxide ($LiNiO_2$), which is substituted with one or more transition metals; lithium manganese oxide substituted with one or more transition metals; lithium nickel oxide represented by $LiNi_{1-y}M_yO_2$ (wherein M=Co, Mn, Al, Cu, Fe, Mg, B, Cr, Zn or Ga, the oxide contains at least one of these elements, and y satisfies $0.01 \leq y \leq 0.7$); lithium nickel cobalt manganese composite oxide represented by $Li_{1+z}Ni_bMn_cCo_{1-(b+c+d)}M_dO_{(2-e)}A_e$ (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl) such as $Li_{1+z}Ni_{1/3}Co_{1/3}Mn_{1/3}O_2$ and $Li_{1+z}Ni_{0.4}Mn_{0.4}Co_{0.2}O_2$; olefin-based lithium metal phosphate represented by $Li_{1+x}M_{1-y}M'_yPO_{4-z}X_z$ (wherein M is a transition metal, preferably, Fe, Mn, Co or Ni, M'=Al, Mg or Ti, X=F, S or N, and $-0.5 \leq x \leq 0.5$, $0 \leq y \leq 0.5$, $0 \leq z \leq 0.1$), and so forth, without being particularly limited thereto.

The conductive agent is generally added so that the conductive agent accounts for 1 wt % to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive substances, such as polyphenylene derivatives, may be used as the conductive agent.

The binder is a component assisting in binding between an active material and a conductive agent and in binding with a current collector. The binder is generally added in an amount of 1 wt % to 30 wt % based on the total weight of the compound including the positive electrode active material. Examples of the binder may be polyvinylidene fluoride, polyvinyl alcohol, carboxymethylcellulose (CMC), starch, hydroxypropylcellulose, regenerated cellulose, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of an electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by, for example, applying a negative electrode mixture comprising a negative electrode active material on a negative electrode current collector and drying the negative electrode mixture. The negative electrode mixture may optionally further comprise the foregoing components such as the conductive agent, the binder, the filler and the like, as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of a negative electrode active material, in the same manner as the positive electrode current collector. The negative electrode current collector may be configured in various forms, such as those of a film, a sheet, a foil, a net, a porous body, a foam body, and a non-woven fabric body.

The negative electrode active material may include, for example, carbon such as non-graphitized carbon and graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me=Mn, Fe, Pb, Ge; Me'=Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer, such as polyacetylene; or a Li—Co—Ni-based material.

The binder, the conductive agent, and components added as needed are the same as those described for the positive electrode.

According to circumstances, the filler may be optionally added as a component used to inhibit expansion of a negative electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

In addition, other components such as a viscosity controlling agent and an adhesion promoter may be optionally further included or may be further included in a combination of two or more.

The viscosity controlling agent is a component for controlling the viscosity of an electrode mixture so as to facilitate mixing of the electrode mixture and coating thereof on a current collector and may be added in an amount of 30 wt % based on a total weight of a negative electrode mixture. Examples of the viscosity controlling agent include, without being limited to, carboxymethylcellulose and polyvinylidene fluoride. According to circumstances, the solvent described above may simultaneously serve as a viscosity controlling agent.

The adhesion promoter is an auxiliary component added to enhance adhesion between an electrode active material and an electrode current collector and may be added in an amount of 10 wt % or less based on the amount of the binder. Examples of the adhesion promoter include, without being limited to, oxalic acid, adipic acid, formic acid, acrylic acid derivatives, and itaconic acid derivatives.

The separator is interposed between the positive electrode and the negative electrode and, as the separator, a thin insulation film having a high ion permeability and excellent mechanical strength is used. The separator typically has a pore diameter of 0.01 μm to 10 μm and a thickness of 5 μm to 300 μm. As the separator, a sheet or non-woven fabric made of olefin polymer such as polypropylene and/or glass fibers or polyethylene, which have chemical resistance and hydrophobicity, is used. When a solid electrolyte such as a polymer is used as an electrolyte, the solid electrolyte may also serve as a separator.

The lithium salt-containing non-aqueous electrolyte consists of a non-aqueous electrolyte and a lithium salt. As the non-aqueous electrolyte, a non-aqueous organic solvent, an organic solid electrolyte, an inorganic solid electrolyte, or the like may be used.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt used herein is a material readily dissolved in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the electrolyte. If necessary, in order to impart non-flammability, the electrolyte may further include halogen-containing solvents such as carbon tetrachloride and ethylene trifluoride. Further, in order to improve high-temperature storage characteristics, the electrolyte may further include carbon dioxide gas. Fluoro-ethylene carbonate (FEC), propene sultone (PRS), and the like may be further included to the electrolyte.

In one preferable embodiment, a lithium salt such as $LiPF_6$, $LiClO_4$, $LiBF_4$, $LiN(SO_2CF_3)_2$ and the like may be added to a mixture of cyclic carbonate of EC or PC as a high dielectric solvent and linear carbonate of DEC, DMC or EMC as a low viscosity solvent, to prepare a lithium salt-containing non-aqueous electrolyte.

Hereinafter, the present invention will be described with reference to the following examples. These examples are provided only for illustration of the present invention and should not be construed as limiting the scope of the present invention.

Manufacture of Separator

A separator body having a porous structure made of polyolefin material is prepared.

In order to form a coating layer having low hardness, a first coating layer including 80 wt % of $Al_2O_3$ as an inorganic material and 20 wt % of polyvinylidene fluoride as a binder was prepared.

In order to form a coating layer having high hardness, a second coating layer including 80 wt % of $BaTiO_2$ as an inorganic material and 20 wt % of carboxymethylcellulose as a binder was prepared.

Manufacture of Positive Electrode

A positive electrode mixture slurry was prepared by adding 95 wt % of $Li(Ni_{0.6}Mn_{0.2}Co_{0.2})O_2$ as a positive electrode active material, 2.0 wt % of Super-P as a conductive agent, and 3.0 wt % of polyvinylidene fluoride as a binder to NMP (N-methyl-2-pyrrolidone) as a solvent. The positive electrode mixture slurry was coated on an aluminum foil, and was then dried and pressed to manufacture a positive electrode.

Manufacture of Negative Electrode

A negative electrode mixture slurry was prepared by adding 96 wt % of natural graphite as a negative electrode active material, 1.0 wt % of Super-P as a conductive agent, 2.0 wt % of styrene butadiene rubber as a binder, and 1.0 wt % of carboxymethylcellulose as a thickener to $H_2O$ as a solvent. The negative electrode mixture slurry was coated on a copper foil, and was then dried and pressed to manufacture a negative electrode.

Example 1

A separator was manufactured by coating the first coating layer on a first surface of the separator body prepared above and the second coating layer on a second surface of the separator body prepared above. An electrode assembly was manufactured by disposing the positive electrode on the first coating layer and the negative electrode on the second coating layer.

A pressing process using a pair of pressing rolls on the electrode assembly was performed, completing the manufacture of an electrode assembly having a difference in porosity.

The rolling process using the pressing rolls was performed by applying a pressure of 3 MPa for 0.5 seconds at a temperature of 80° C.

Comparative Example 1

An electrode assembly was manufactured in the same manner as in Example 1, except that the first coating layer was coated on the first surface and the second surface of the separator body of Example 1, the positive electrode was disposed on the first coating layer of the first surface of the separator body, and the negative electrode was disposed on the first coating layer of the second surface of the separator body.

Comparative Example 2

An electrode assembly was manufactured in the same manner as in Example 1, except that the second coating layer was coated on the first surface and the second surface of the separator body of Example 1, the positive electrode was disposed on the second coating layer of the first surface of the separator body, and the negative electrode was disposed on the second coating layer of the second surface of the separator body.

Example 2

An electrode assembly was manufactured in the same manner as in Example 1, except that the negative electrode was disposed on the first coating layer of Example 1, and the positive electrode was disposed on the second coating layer of Example 1.

Comparative Example 3

An electrode assembly was manufactured in the same manner as in Example 1, except that the negative electrode was disposed on the first coating layer of the first surface of the separator body of Comparative Example 1, and the positive electrode was disposed on the first coating layer of the second surface of the separator body of Comparative Example 1.

Comparative Example 4

An electrode assembly was manufactured in the same manner as in Example 1, except that the negative electrode was disposed on the second coating layer of the first surface of the separator body of Comparative Example 2, and the positive electrode was disposed on the second coating layer of the second surface of the separator body of Comparative Example 2.

Example 3

An electrode assembly was manufactured in the same manner as in Example 1, except that the first coating layer and the second coating layer were removed from the separator of Example 1.

Comparative Example 5

An electrode assembly was manufactured in the same manner as in Example 1, except that the first coating layer and the second coating layer were removed from the separator of Comparative Example 1.

Comparative Example 6

An electrode assembly was manufactured in the same manner as in Example 1, except that the first coating layer and the second coating layer were removed from the separator of Comparative Example 2.

Example 4

An electrode assembly was manufactured in the same manner as in Example 1, except that the first coating layer and the second coating layer were removed from the separator of Example 2.

Comparative Example 7

An electrode assembly was manufactured in the same manner as in Example 1, except that the first coating layer and the second coating layer were removed from the separator of Comparative Example 3.

Comparative Example 8

An electrode assembly was manufactured in the same manner as in Example 1, except that the first coating layer and the second coating layer were removed from the separator of Comparative Example 4.

<Experimental Example 1> Measurement of Initial Resistance

Battery cells including the electrode assemblies manufactured in Examples 1 to 4 and Comparative Examples 1 to 8 were subjected to CC/CV charge under cut-off conditions of 4.2 V, 0.33 C and 0.5%, and CC discharge under conditions of 2.5 Vm and 0.33 C twice.

Thereafter, the voltage drop occurred when a SOC 50% battery cell was discharged for 30 seconds with a current of 2.5 C was recorded, and a DC resistance value was calculated using R=V/I (Ohm's Law). The results are shown in Table 1 below.

<Experimental Example 2> Measurement of Capacity Retention

For secondary batteries including the electrode assemblies prepared in Examples 1 to 4 and Comparative Examples 1 to 8, measurement of capacity retention was performed by measuring discharge capacity while repeating 50 cycles, wherein each cycle comprises charging the battery to 4.2 V in constant current/constant voltage (CC/CV) charge mode at 1 C, then, discharging the same in constant current (CC) discharge mode under cut-off conditions of 1 C and 2.5 V. The results are shown in Table 1 below.

TABLE 1

| | Initial resistance (Ohm) | Capacity retention (%) |
|---|---|---|
| Example 1 (positive electrode/separator/negative electrode) | 0.87 | 94 |
| Comparative Example 1 (positive electrode/separator/negative electrode) | 1.24 | 87 |
| Comparative Example 2 (positive electrode/separator/negative electrode) | 1.11 | 90 |
| Example 2 (negative electrode/separator/positive electrode) | 1.15 | 88 |
| Comparative Example 3 (negative electrode/separator/positive electrode) | 1.23 | 87 |
| Comparative Example 4 (negative electrode/separator/positive electrode) | 1.11 | 91 |
| Example 3 (positive electrode/separator/negative electrode) | 0.78 | 95 |
| Comparative Example 5 (positive electrode/separator/negative electrode) | 1.12 | 88 |
| Comparative Example 6 (positive electrode/separator/negative electrode) | 0.99 | 91 |
| Example 4 (negative electrode/separator/positive electrode) | 1.04 | 89 |
| Comparative Example 7 (negative electrode/separator/positive electrode) | 1.11 | 88 |
| Comparative Example 8 (negative electrode/separator/positive electrode) | 0.99 | 92 |

Referring to Table 1, when comparing Example 1, Comparative Example 1 and Comparative Example 2 in which the positive electrode was disposed on the first coating layer having low hardness and the negative electrode was disposed on the second coating layer having high hardness, Example 1 having a difference in porosity using the separator manufactured by applying the first coating layer and the second coating layer to was measured to have the initial resistance of 0.87 ohm, exhibiting the lowest initial resistance and the highest capacity retention.

On the other hand, when comparing Example 2, Comparative Example 3 and Comparative Example 4 in which the negative electrode was disposed on the first coating layer and the positive electrode was disposed on the second coating layer although there is a difference in porosity along the thickness direction, Example 3 was measured to have a higher initial resistance and a lower capacity retention than Comparative Example 4, although Example 3 is a form having a difference in porosity by applying the first coating layer and the second coating layer. Accordingly, it can be seen that in a separator having a difference in porosity along the thickness direction, it is preferable to dispose an electrode with high ionic conductivity on the side with a lower porosity and an electrode with low ionic conductivity on the side with a higher porosity.

In addition, when comparing Comparative Example 1 and Comparative Example 3, and Comparative Example 2 and Comparative Example 4 in which the coating layers having the same hardness were formed on both sides of the separator body, the separators having no difference in porosity were used, showing similar results each other.

Referring to the results of Example 3, Example 4 and Comparative Examples 5 to 8 in which the first coating layer and the second coating layer were washed and removed, Example 3 in which the positive electrode was disposed on the first surface side of the separator body and the negative electrode was disposed on the second surface side of the separator body was measured to have the initial resistance of 0.78 ohm, exhibiting the lowest initial resistance compared to Comparative Examples 5 to 8, and an excellent capacity retention.

In addition, when comparing the results of Example 1, Example 2 and Comparative Examples 1 to 4, and the results of Example 3, Example 4 and Comparative Examples 5 to 8, it can be seen that, under the same conditions, the results of the separators from which the coating layer was removed and the separators from which the coating layer was not removed have the same tendency.

Therefore, it can be seen that when a separator having a difference in porosity along the thickness direction of a separator body is used, the resistance is decreased and the capacity retention is increased compared when a separator having a constant porosity is used.

In addition, since differences in initial resistance and capacity retention may occur depending on whether the electrode adhered to each of the first surface and second surface of the separator is positive or negative, it can be seen that the direction in which the positive electrode and the negative electrode are combined with the separator greatly affects the performance of the secondary battery.

Those skilled in the art to which the present invention pertains will appreciate that various applications and modifications are possible based on the above description, without departing from the scope of the present invention.

INDUSTRIAL APPLICABILITY

As is apparent from the above description, a separator for a secondary battery according to the present invention is configured such that a surface facing a positive electrode and a surface facing a negative electrode have different porosities, and therefore it is possible to improve the problem of imbalance in ionic conductivity caused by differences in thickness and electrical conductivity between a positive electrode and a negative electrode.

In addition, when an electrode assembly manufactured using the separator having such properties is used, it is possible to improve the capacity and cycle characteristics of the secondary battery.

In addition, since the performances of the positive electrode and the negative electrode are similarly exhibited, the capacity of the positive electrode and the negative electrode may be designed equally, and thus it is possible to improve the overall energy density of the secondary battery.

In addition, since a rolling process is performed to manufacture the separator having a difference in porosity, it is possible to reduce the thickness of the separator while maintaining the strength of the separator.

The invention claimed is:

1. A separator for a secondary battery, comprising:

a separator body having a porous structure, wherein the separator body consists of a polyolefin, wherein the separator body has a difference in porosity along a thickness direction, wherein the separator further comprises a first coating layer on a first surface of the separator body and a second coating layer on a second surface of the separator body, and wherein the first coating layer and the second coating layer are formed by coating the separator body.

2. The separator for the secondary battery according to claim 1, wherein the separator body does not have an interface in which the difference in porosity occurs, and wherein the porosity continuously changes.

3. The separator for the secondary battery according to claim 1, wherein the separator body comprises at least one of a portion in which a porosity increases along the thickness direction and a portion in which a porosity decreases along the thickness direction.

4. The separator for the secondary battery according to claim 1, wherein the separator body has a maximum porosity at a center of the thickness direction of the separator body.

5. The separator for the secondary battery according to claim 1, wherein a hardness of the first coating layer and a hardness of the second coating layer are different from each other.

6. The separator for the secondary battery according to claim 1, wherein the first coating layer comprises a first inorganic material having a first hardness and a first binder, and the second coating layer comprises a second inorganic material having a second hardness and a second binder, wherein the first inorganic material and the second inorganic material have the same hardness and are present in different amount ratios, or have different hardnesses regardless of a amount ratio.

7. A method of manufacturing the separator for the secondary battery according to claim 1, the method comprising:

1) Preparing the separator body having the porous structure comprising the polyolefin;

2) Forming the first coating layer on the first surface of the separator body of step 1) and forming the second coating layer on the second surface of the separator body of step 1); and 3) pressing the separator of step 2).

8. The method according to claim 7, wherein a hardness of the first coating layer and a hardness of the second coating layer are different from each other.

9. The method according to claim 7, wherein a compression ratio of a first surface side of the separator body and a compression ratio of a second surface side of the separator body are different.

10. The method according to claim 7, wherein the first coating layer comprises a first inorganic material and a first binder, and the second coating layer comprises a second inorganic material and a second binder, wherein a rolling strength of the first coating layer and the second coating layer is dependent on a type and amounts of the first inorganic material, the second inorganic material, the first binder, and the second binder.

11. The method according to claim 7, wherein, in step 3), the same pressure is applied from an outside of the first coating layer and the second coating layer toward the separator body.

12. An electrode assembly having a stacked structure in which the separator according to claim 1 is interposed between a positive electrode and a negative electrode, wherein, between the positive electrode and the negative electrode, an electrode having a first ionic conductivity is disposed in a direction having a first porosity in the separator, and an electrode having a second ionic conductivity lower than the first ionic conductivity is disposed in a direction having a second porosity higher than the first porosity in the separator.

13. A separator for a secondary battery, comprising:

a separator body having a porous structure, extending from a first surface of the separator body to a second surface of the separator body opposite to the first surface in a thickness direction, wherein the separator body consists of a polyolefin, wherein the porous structure has a difference in porosity along the thickness direction, wherein the separator further comprises a first coating layer on the first surface of the separator body and a second coating layer on the second surface of the separator body, wherein the separator has a difference in porosity between a first surface side and a second surface side of the separator body, and wherein the first coating layer and the second coating layer are formed by coating the separator body.

* * * * *